United States Patent
Lv et al.

(10) Patent No.: US 9,436,907 B2
(45) Date of Patent: Sep. 6, 2016

(54) METHOD AND SYSTEM FOR CALCULATING VALUE OF WEBSITE VISITOR

(75) Inventors: Kaili Lv, Hangzhou (CN); Zheng Zhang, Hangzhou (CN); Jie Su, Hangzhou (CN)

(73) Assignee: Alibaba Group Holding Limited (KY)

( * ) Notice: Subject to any disclaimer, the term of this patent is extended or adjusted under 35 U.S.C. 154(b) by 569 days.

(21) Appl. No.: 12/658,767

(22) Filed: Feb. 12, 2010

(65) Prior Publication Data

US 2010/0217734 A1 Aug. 26, 2010

(30) Foreign Application Priority Data

Feb. 23, 2009 (CN) .................... 2009 1 0118103

(51) Int. Cl.
  *G06N 3/02* (2006.01)
  *G06Q 30/02* (2012.01)
  *G06N 3/08* (2006.01)

(52) U.S. Cl.
  CPC ............ *G06N 3/02* (2013.01); *G06Q 30/02* (2013.01); *G06N 3/08* (2013.01)

(58) Field of Classification Search
  None
  See application file for complete search history.

(56) References Cited

U.S. PATENT DOCUMENTS

| | | | |
|---|---|---|---|
| 6,647,377 B2 * | 11/2003 | Jannarone | G06N 3/0454 706/16 |
| 6,766,370 B2 | 7/2004 | Glommen et al. | |
| 6,912,563 B1 | 6/2005 | Parker et al. | |
| 6,993,572 B2 | 1/2006 | Ross, Jr. et al. | |
| 7,069,256 B1 | 6/2006 | Campos | |
| 7,085,682 B1 | 8/2006 | Heller et al. | |
| 7,328,201 B2 | 2/2008 | D'Ambrosio | |
| 7,349,827 B1 | 3/2008 | Heller et al. | |
| 7,370,004 B1 | 5/2008 | Patel et al. | |
| 7,603,373 B2 | 10/2009 | Error et al. | |
| 7,610,289 B2 | 10/2009 | Muret et al. | |
| 7,676,574 B2 | 3/2010 | Glommen et al. | |
| 7,809,661 B2 | 10/2010 | D'Ambrosio | |
| 2002/0062245 A1 | 5/2002 | Niu et al. | |
| 2002/0161664 A1 | 10/2002 | Shaya et al. | |
| 2003/0033587 A1 * | 2/2003 | Ferguson | G06Q 10/04 717/104 |

(Continued)

FOREIGN PATENT DOCUMENTS

| | | |
|---|---|---|
| JP | H08339360 | 12/1996 |
| JP | 2001236337 | 8/2001 |

(Continued)

OTHER PUBLICATIONS

Kambhatla, N., and Leen, T., "Dimension Reduction by Local Principal Component Analysis", Neural Computation vol. 9, 1997, pp. 1493-1516.*

(Continued)

*Primary Examiner* — Kakali Chaki
*Assistant Examiner* — Walter Hanchak
(74) *Attorney, Agent, or Firm* — Van Pelt, Yi & James LLP

(57) ABSTRACT

Calculating a value of a website visitor includes initializing a calculation model for calculating the value of the website visitor, the calculation model being a neural network model with visitor information as an input and the visitor's value as an output; training the calculation model by using a data sample and determining the calculation model; and obtaining the visitor information, and calculating the value of the visitor by using the determined calculation model.

22 Claims, 4 Drawing Sheets

(56) References Cited

U.S. PATENT DOCUMENTS

| | | | |
|---|---|---|---|
| 2003/0149603 A1* | 8/2003 | Ferguson | G06Q 30/06 705/64 |
| 2005/0086110 A1 | 4/2005 | Haley et al. | |
| 2005/0246299 A1 | 11/2005 | Scarborough et al. | |
| 2006/0271669 A1* | 11/2006 | Bouguenon | G06F 17/30867 709/224 |
| 2006/0271671 A1* | 11/2006 | Hansen | G06F 17/30899 709/224 |
| 2006/0294199 A1* | 12/2006 | Bertholf | G06F 17/30893 709/217 |
| 2007/0198321 A1 | 8/2007 | Lakshminarayan et al. | |
| 2007/0250468 A1 | 10/2007 | Pieper | |
| 2008/0010045 A1 | 1/2008 | Black et al. | |
| 2008/0028067 A1 | 1/2008 | Berkhin et al. | |
| 2008/0071630 A1 | 3/2008 | Donahue | |
| 2008/0306830 A1* | 12/2008 | Lasa | G06Q 30/02 705/14.16 |
| 2009/0006156 A1 | 1/2009 | Hunt et al. | |
| 2009/0018996 A1 | 1/2009 | Hunt et al. | |
| 2010/0205541 A1* | 8/2010 | Rapaport | G06Q 10/10 715/753 |

FOREIGN PATENT DOCUMENTS

| | | |
|---|---|---|
| JP | 2004086896 | 3/2004 |
| JP | 2007026456 | 2/2007 |
| WO | 0067412 | 11/2000 |

OTHER PUBLICATIONS

Kambhatla, N., and Leen, T., "Dimension Reduction by Local Prinicpal Component Analysis", Neural Computation, vol. 9, 1997, pp. 1493-1516.*

Jantzen, Jan, "Introduction to Perceptron Networks", Technical University of Denmark, Lyngby, Denmark, Tech Report No. 98-H 873 (nnet), 1998, pp. 1-32.*

Zoeter, Taylor, Snelson, Guiver, Craswell, Szummer, "A Decision Theoretic Framework for Ranking using Implicit Feedback", Proceedings of the 2008 International Workshop on Learning to Rank for Information Retrieval (LR41R 2008) in conjuction with ASM SIGIR 2008, 2008, pp. 24-31.*

Kambhatla, N. and Leen, T., "Dimension Reduction by Local Principal Component Analysis", Neural Computation, vol. 9, 1997, pp. 1493-1516.*

Janzen, Jan, "Introduction to Perception Networks", Technical University of Denmark, Lyngby, Denmark, tech report No. 98-H 873 (nnet), 1998, pp. 1-32.*

Nazzal, El-Emary and Najim, "Multilayer Perceptron Neural Network (MLPs) for Analysing the Properties of Jordan Oil Shale", World Applied Sciences Journal 5 (5): 2008, pp. 546-552.*

Zoeter, Taylor, Snelson, Guiver, Craswell, Szummer, "A Decision Theoretic Framework for Ranking using Implicit Feedback", Proceedings of the 2008 International Workshop on Learning to Rank for Information Retrieval (LR41R 2008) in conjuction with ACM SIGIR 2008, 2008, pp. 24-31.*

Gupta, Hanssens, Hardie, Kahn, Kumar, Lin, Ravishanker, Sriram, "Modeling Customer Lifetime Value", Journal of Service Research, vol. 9, No. 2, Nov. 2006, pp. 138-155.*

Brass, Using Neural Networks to Analyze Surveys, from Quirk's Marketing Research Media, Jun. 2001, pp. 1-6.*

Levenburg, "Delivering Customer Value Online: An Analysis of Practises, Applications, and Performance", Journal of Retailing and Consumer Services, vol. 12, 2005, pp. 319-331.*

Marc Aurelio Ranzato, Y-Lan Boureau, Yann LeCun, "Sparse Feature Learning for Deep Belief Networks", Proceedings of Advances in Neural Information Processing Systems 20 (NIPS 2007), 2007, pp. 1-8.*

Yuan et al., "Web Users' Classification Using Fuzzy Neural Network", Lecture Notes in Computer Science, 2004, vol. 3213/2004, Sep. 1, 2004.

Balagani et al., "Adaptive neural network clustering of web users", Computer, IEEE service center, Los Alamitos, CA, US, vol. 37, No. 4, Apr. 1, 2004.

* cited by examiner

METHOD AND SYSTEM FOR CALCULATING VALUE OF WEBSITE VISITOR

CROSS REFERENCE TO OTHER APPLICATIONS

This application claims priority to People's Republic of China Patent Application No. 200910118103.7 entitled METHOD AND SYSTEM FOR CALCULATING VALUE OF WEBSITE VISITOR filed Feb. 23, 2009, which is incorporated herein by reference for all purposes.

FIELD OF THE INVENTION

The present invention relates to network technologies, and in particular to a method and system for calculating a value of a website visitor.

BACKGROUND OF THE INVENTION

Currently, many enterprises present information and product marketing by means of websites. The development of network technologies has made it possible for more interactions to be implemented between websites and visitors. For example, a webmaster may know some information regarding the visitors through the network management system, determine the values of the visitors according to such information, and then further perform some service activities for a visitor of a certain value. Service activities may include contacting the visitor, providing the visitor with more detailed information, and so on.

For a website with numerous visitors, manually determining the value of every visitor is labor intensive and inefficient. In the prior art, automatically determining the value of a website visitor is implemented by setting a single category or a combination of multiple categories of "visitor information" as a condition, and determining whether the condition is met. If the condition is met, then the visitor is of a certain value and the webmaster is informed of this information. The condition may include the number of visits exceeding a certain value, the number of visited pages exceeding a certain value, whether a certain page has been visited, whether the visitor is from a certain province and city, and so on.

The above method of combining conditions typically only applies to simple correspondence relationships between a visitor information and the visitor's value. However, in practice, there are more complicated correspondence relationships between the visitor information and the visitor's value than can be accounted for by merely combining conditions. For example, if the visitor comes from Beijing, then his/her visit to a page A is valuable whereas if the visitor comes from Shanghai, then his/her visit to a page B is valuable. Also, for example, a male visitor's visit to a page C is valuable, and a female visitor's visit to a page D is valuable. There are numerous similar situations and some even more complicated than the given examples. These correspondence relationships tend to be nonlinear or even indeterminate (i.e. the webmaster is unaware that his/her initiative activities result in a certain correspondence relationship). However, it is difficult to take into account all these complicated correspondence relationships just by using the method of combining conditions. Therefore, techniques for automatically determining a visitor's value that more accurately reflect such complicated correspondence relationships are needed.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

To provide better understanding of the solutions provided by the present application for those skilled in the art, embodiments of the present invention are further detailed herein below with reference to the accompanying drawings.

Figure 1A:
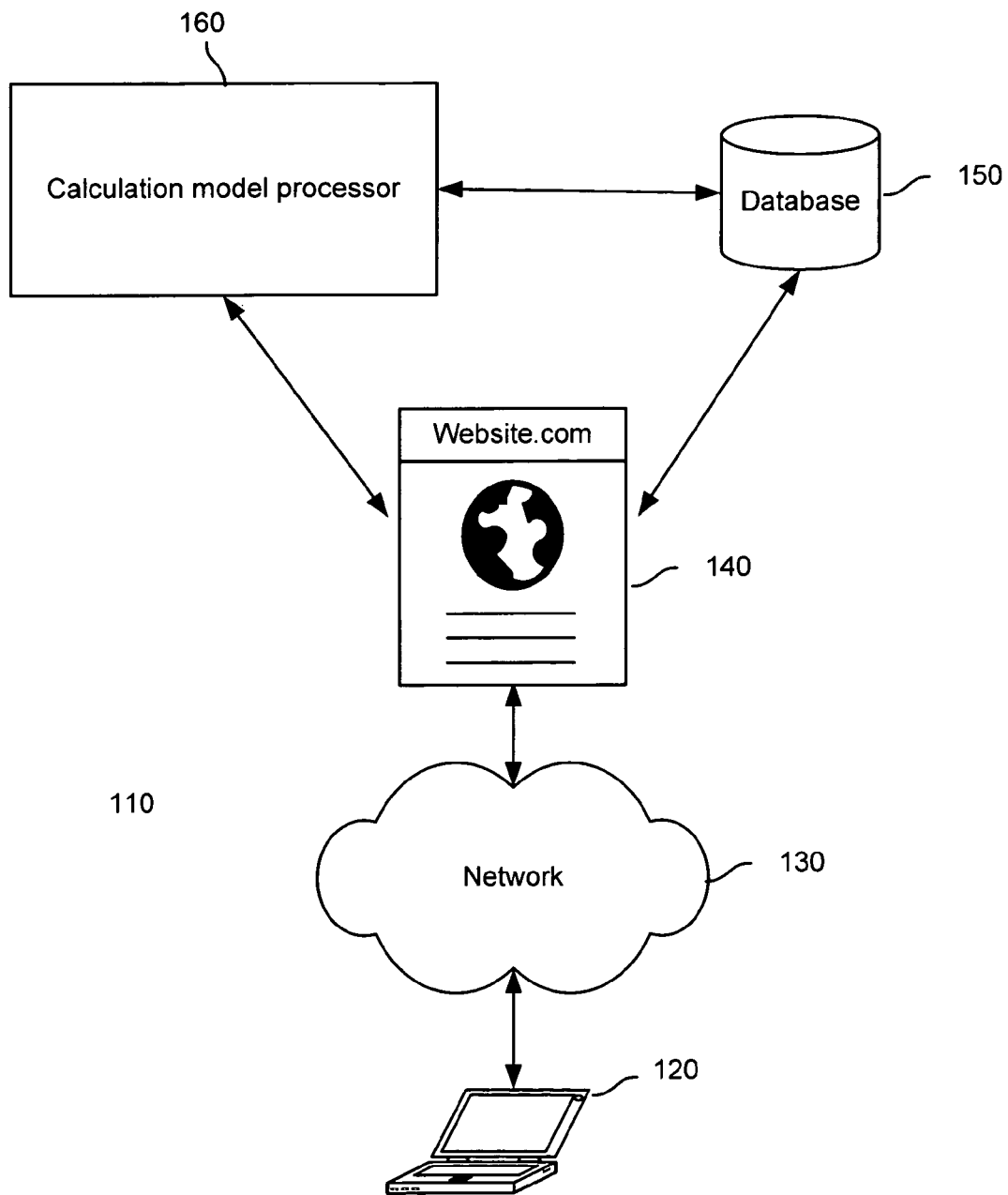
FIG. 1A is a block diagram illustrating an embodiment of a system for calculating a value of a website visitor.

FIG. 1A is a block diagram illustrating an embodiment of a system for calculating a value of a website visitor. In the example shown, the system 110 includes client device 120, network 130, website 140, database 150, and a calculation model processor 160. A user may use client device 120, which may include a computer or mobile device, to access website 140 over network 155, which may be the Internet or another communications network. Website 140 may include one or more interfaces configured to collect information regarding the user (e.g. website visitor), either by having the user manually register information or by automatically detecting information (e.g. user's IP address). In some embodiments, the website may include a network management system (not shown). In some embodiments, website 140 may be operated by a webmaster (not shown). In some embodiments, information collected by website 140 regarding the website visitor may be stored in database 150. In some embodiments, stored information on database 150 may be accessed by either or both website 140 and calculation model processor 160. Calculation model processor 160 may send and receive information with the website 140. In some embodiments, calculation model processor 160 may perform any one or more of (but is not limited to) the following activities: initializing a calculation model, determining a calculation model, obtaining information regarding a website visitor, calculating a website visitor's value with a determined calculation model, and correcting a determined calculation model. In some embodiments, calculation model processor 160 may comprise of one or more devices having one or more processors coupled to one or more memories.

Figure 1B:
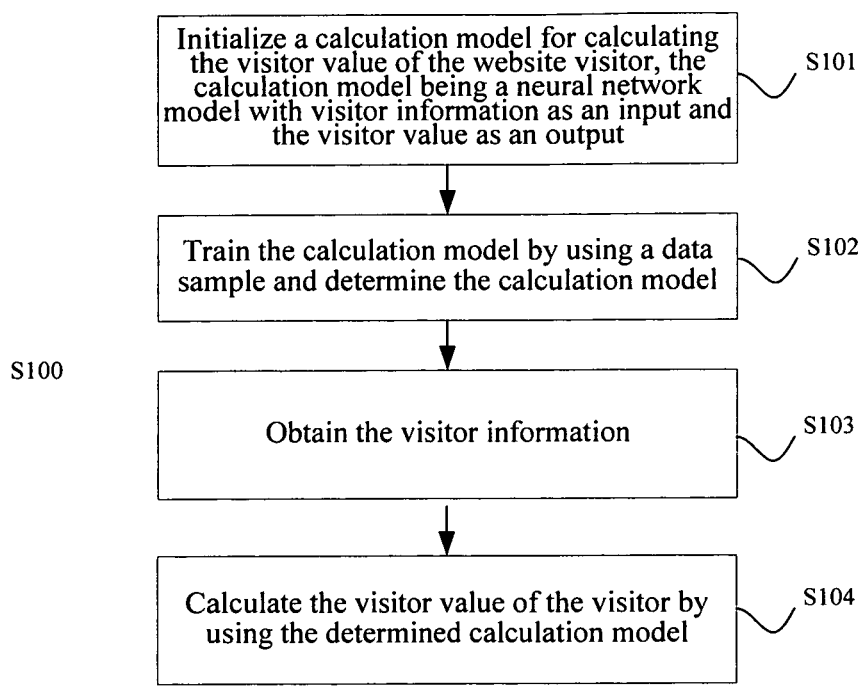
FIG. 1B is a flowchart of an embodiment of a method for calculating a value of a website visitor.

FIG. 1B is a flowchart of an embodiment of a method for calculating a value of a website visitor. The method S100 may be performed on a system such as 110. At S101, a calculation model for calculating the value of the website visitor is initialized. In some embodiments, initializing the calculation model involves choosing a neural network for the calculation model, where the neural network uses visitor information as an input and yields the visitor's value as an output. In some embodiments, initializing the calculation model also involves selecting the appropriate number of nodes for at least one layer of the neural network calculation model. Hereinafter, "output" of the calculation model may be sometimes referred to as the "value of the visitor" or "determination result." Visitor information may comprise of more than one category of information regarding the visitor. In some embodiments, a visitor's value determines how a webmaster interacts with the visitor. For example, a webmaster or an automated process might perform different service activities for the visitor based on the visitor's value. A neural network model may be a computational system that models complex relationships between inputs and outputs. For example, a neural network model may comprise of interconnected computational units called "neurons" or "nodes." Furthermore, a neural network model may be an adaptive system that can be trained to learn the desired relationships between the inputs and outputs. A neural network model may be implemented with software, for example.

In order to automatically calculate the value of the visitor based on the visitor information, a correspondence relationship between various categories of visitor information and the visitor's values needs to be established. In practice, the correspondence relationship between the various categories of visitor information and the visitor's values tends to be nonlinear or even indeterminate. A neutral network model is capable of modeling such nonlinear and complex relationships. Therefore, choosing a neural network as the calculation model can effectively solve the above problem.

Figure 2:
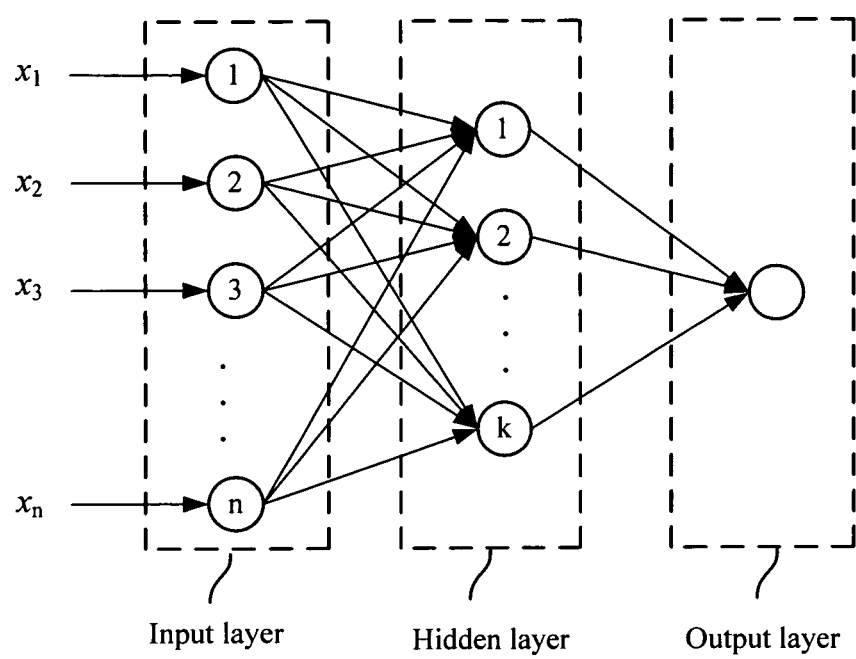
FIG. 2 is a diagram illustrating an embodiment of a calculation model where the calculation model is a neural network model.

FIG. 2 is a diagram illustrating an embodiment of a calculation model where the calculation model is a neural network model. The shown neutral network model includes an input layer, a hidden layer and an output layer. Each layer comprises of at least one node. The mathematic description of the model is as follows:

$$Y = F(X)$$
$$= f_2(W_2 f_1(W_1 X + B_1) + B_2)$$

where X is an input vector; Y is an output vector; $W_1$ is a hidden layer weight matrix; $B_1$ is a hidden layer bias vector; $f_1$ is a hidden layer transfer function; $W_2$ is an output layer weight matrix; $B_2$ is an output layer bias vector; and $f_2$ is an output layer transfer function. In the present embodiment, $W_1$, $W_2$, $B_1$, $B_2$ are the parameters of the neural network calculation model.

The calculation model takes the visitor information as an input (i.e. an n-dimensional column vector X, where the numerical value of each dimension represents a category of visitor information) and yields the visitor's value as an output (i.e. an m-dimensional column vector Y). Assuming there are k nodes in the hidden layer of the model, then $W_1$ is a k×n matrix, $B_1$ is a k-dimensional column vector, $W_2$ is an m×k matrix and $B_2$ is an m-dimensional column vector.

In the present embodiment, the visitor's value to be calculated can be represented by one numerical value and thus the output vector Y is one-dimensional. Input vector X and the output vector Y may be set to any desired number of dimensions. The present embodiment is not limited thereto.

In the present embodiment, a non-linear action function, i.e. Sigmoid function in the form of $f(x)=1/(1+e^{-x})$, is selected as the hidden layer transfer function $f_1$, and a linear function is selected as the output layer transfer function $f_2$. Theoretical research shows that for a neural network, using a Sigmoid transfer function in its hidden layer and using a linear transfer function in its output layer can approximately model any function of interest to any degree of accuracy.

With respect to the k number of nodes in the hidden layer: more hidden layer nodes may speed up the learning process of the neural network, but may also complicate the structure of the model and degrade the adaptability of the model. To find an appropriate k number of nodes in the hidden layer, the number of the nodes may be adjusted during the training process. For example, the appropriate number of hidden layer nodes may be determined by using a trial-and-error method to cross-evaluate errors between test samples and training samples. Those skilled in the art may determine the appropriate number of hidden layer nodes using another method. The present embodiment is not limited thereto.

In the present embodiment, the parameters $W_1$, $W_2$, $B_1$, $B_2$ and the like of the neural network model may be determined by training, which is described below.

Returning to FIG. 1B, at S102, the initialized calculation model is trained to model the desired correspondence relationship between the inputs (e.g. visitor information) and outputs (e.g. value of a visitor). The trained calculation model is thus the determined calculation model. For example, the calculation model may be trained by feeding the model data samples and adjusting the parameters of the calculation model so that the calculated sample outputs closely approximate the desired sample outputs. The calculation model thus learns the desired correspondence relationship through the training process. Training of the calculation model may be conducted manually.

For training the calculation model, a group of historical data from the website can be chosen as the sample inputs to be fed to the model. One example of the sample input is the visitor information, which can be divided into two major categories of "visitor attribute information" and "visitor activity information". The "visitor attribute information"

refers to information which is relatively static. Examples of "visitor attribute information" include gender, age, region and the like of the visitor. The "visitor activity information" refers to information which may change dynamically in a short period of time. Examples of "visitor activity information" include the number of visits to the website, the page visited, the stay time of a visit, whether the visitor is performing certain affirmative activities (e.g. chatting, sending email), and the number of times of an affirmative activity, etc.

In order to make the neural network calculation model capable of identifying sample inputs such as visitor information, the visitor information can be numerically processed. For example, information such as time, number and the like can be represented by actual numerical values; information that has a value of Yes or No can be represented by numerical numbers 1 or 0 respectively; and for information such as region and the page visited, various possible values thereof can be encoded to represent each type of information. As an example, for information such as the "region of the visitor", 001 can be used to represent Beijing, 002 can be used to represent Shanghai, and so on.

In some embodiments, the webmaster may determine the value of each visitor based on a variety of information regarding the visitor. In some embodiments, the determination process (e.g. calculating the value of the each visitor based on visitor information) should be objective, i.e. the determination result for the same information should not be changed by subjective understanding of a person. Of course, depending on specific desired requirements, there may be various ways to represent the determination result, e.g. the value of the visitor is either valuable or valueless, the value is divided into specific classifications, the value is associated with some specific service activities such as contacting the visitor (making a call, chatting over network, sending email, etc.) or adding the visitor into the Client Relationship Management (CRM) system, and so on.

Like the sample input, the desired sample output should also be numerically processed. The specific processing method applied to the desired sample output can be similar to one used for the numerical processing of the sample input such as visitor information. If the determination result is associated with a "specific service activity", the same visitor may be served with various kinds of service activities. Thus, depending on specific requirements, the determination result may include representations of multiple kinds of service activities and their respective levels of importance, which may be represented by weights associated with those activities. For example, adding a visitor into the CRM can mean that the visitor is more valuable, while trying to chat with a visitor means that the visitor is relatively less valuable. Thus, the weight of the service activity of "adding into CRM" should be higher than the weight of the service activity of "chatting".

There exists a correspondence relationship between the data sample input and the desired sample output (e.g. between the "visitor information" and the "visitor's value", respectively), which is difficult to directly describe using objective service requirements. But based on training of the calculation model, the neural network can effectively represent the complicated correspondence relationship between the sample data inputs and desired sample outputs as weights, biases, and the like.

The Back Propagation (BP) algorithm is used for training the neural network calculation model in some embodiments. Commonly used BP techniques include Gradient Descent (GD), Gradient Descent with Adaptive learning rate (GDA), Gradient Descent with Momentum (GDM), Gradient Descent with momentum and adaptive learning rate (GDX) and Levenberg-Marquardt (LM), etc. The preferred embodiment uses the LM BP algorithm, which has a high convergence performance, to achieve the best implementation results. To begin training, a set of inputs (e.g. ½ of the entire set of samples) is selected randomly from the entire set of data samples. The selected data sample inputs are fed into the neural network model and each calculated sample output value is compared with the desired sample output value. The undetermined parameters (e.g. $W_1$, $W_2$, $B_1$, $B_2$, etc.) are continuously adjusted according to the results of the comparisons so that the errors between the calculated sample output values and the desired sample output values are minimized as much as possible, thereby having the calculated sample output values closely approximate the desired sample outputs. The accuracy of the model can be evaluated by square errors. When the error between the calculated sample output value and the desired sample output value meets a certain accuracy requirement (e.g. the square error is lower than 10%), the training is completed and the appropriate calculation model is thus determined.

During training, a set of inputs selected from outside of the training set can be used to confirm the accuracy of the calculation model. In an ideal training process, the square error of the training set should gradually decrease with the increasing numbers of trainings. The confirmation set seeks to confirm whether the square error of the confirmation set decreases after each time (or several times) of training. If the square error of the confirmation set does decrease after successive trainings, then the training of the model may be continued. Otherwise, the training is stopped and the parameters of the model are re-determined. The advantage of introducing the confirmation set is that the best error control standard can be adaptively obtained for the neural network calculation model, which thereby avoids over-adaptation resulting from the network learning and the difficulty of selecting only one error control standard.

At S103, the visitor information to be used as inputs for the determined calculation model is obtained.

After the training is completed, the visitor's value can be calculated using the determined calculation model. Depending on specific requirements, those skilled in the art can obtain the visitor information through various means. For example, the "visitor attribute information" such as gender, age, region and the like can be obtained from the information registered with the website by the visitor. The region information of the visitor can also be obtained from the visitor's IP address. The "visitor activity information" can be obtained, for example, by the network management system of the website.

After the information of a certain visitor is obtained, the information is input into the determined calculation model, which outputs the value of the visitor. Since the determined calculation model was manually trained to output a certain desired value for each input, the calculated output of the determined calculation model tends to be consistent with the desired output value. The webmaster can determine whether to carry out a further service activity for the visitor based on the output value.

If the input to the calculation model contains only information which is relatively static (e.g. "visitor attribute information"), then the output visitor's value can be calculated without the need to update the value as long as the service requirement has not changed. But if the input to the calculation model contains information which may be dynamically changed in a short period of time (e.g. "visitor activity information"), then the output visitor's value should also be dynamically updated. Regarding dynamic visitor information, the website management system can periodically provide andupdate the calculation model with the user information (alternatively, the webmaster can manually provide andupdate the user information), so the visitor's value may be dynamically updated.

In the calculation model, one (or more) visitor's value threshold can be preset. When the output value of the model is higher than the threshold, the webmaster may be prompted by a sound, a visual change on screen and the like. This way, the webmaster can avoid paying attention to "valueless" visitors and thereby improve working efficiency.

According to the preferred embodiment of the present invention, the determined calculation model can be further corrected. For example, certain categories of visitor information can be eliminated from the parameters of the determined calculation model. For example, if it is found that certain visitor information is only weakly correlated to the calculated visitor's value (meaning that such input information has little influence on the final result of the determination process); then the component corresponding to such information can be deleted from the input vector of the calculation model, which improves the calculation performance of the model. Specifically, a correlation threshold can be preset. When it is detected that the correlation between the visitor information of a certain visitor and the visitor's value thereof is lower than the threshold, then the corresponding component is deleted, or alternatively, such information is sent to the webmaster for his/her decision of whether or not to delete the component.

In addition, when using the determined calculation model, the actual output value of the determined calculation model may be, periodically or at random, compared with the desired output value. Of course, the desired output value needs to be known. If the comparison result shows that the error between the actual output value and the desired output value is beyond a certain preset threshold, which may result from a change of specific service requirements, then the determined calculation model is outdated. At this time, the determined calculation model may be re-trained to be adaptive to the change of the service requirements. If the webmaster is a aware of the change of service requirements, then the webmaster can trigger the process for re-training the determined calculation model on his/her own initiative.

At S104, the value of the website visitor is calculated by using the determined calculation model. The method for calculating a value of a website visitor according to the present embodiment is described with reference to a specific example as shown below. It is assumed that an enterprise provides two types of products for junior high school students and senior high school students, respectively, and publishes the information of the two types of products on pages A and B of the website, respectively. The webmaster may follow the following correspondence relationships when determining the value (either "valuable" or "valueless") of a visitor:

1) a visitor at the age of 10-16 years and having visited page A more than 3 times is considered as valuable;

2) a visitor at the age of 14-20 years and having visited page B more than 3 times is considered as valuable;

3) a visitor at the age of more than 35 years (which may be regarded as a parent of a student) and having visited page A or B more than 3 times is considered as valuable;

4) a visitor having visited page A or B more than 10 times is considered as valuable; and 5) a visitor at the age of 10 or more years and having sent an inquiry message to the website is considered as valuable.

According to the above requirements, it can be first determined that the input parameters to the calculation model include three categories, i.e. "age of visitor", "number of visits to page A (or B)" and "having sent inquiry message to website or not"; and the output from the calculation model is the visitor's value. In the initialized calculation model $Y=F(X)$, X is a three-dimensional vector and Y is a one-dimensional vector.

Further, the input and the output of the calculation model need to be numerically processed. Actual numerical values may be used for the "age of visitor" and the "number of visits to page A (or B)". For "having sent inquiry message to the website or not", a numerical value 1 may be used to represent "yes" and a numerical value 0 may be used to represent "no". Similarly, for the determination result of the "visitor being valuable or not", which acts as the desired sample output, a numerical value 1 may be used to represent "yes" and a numerical value 0 may be used to represent "no".

After the calculation model $Y=F(X)$ is determined by training, the visitor's value can be calculated by using the determined calculation model. In the present example, the "age of visitor" may be obtained from the information registered in the website by the visitor. Preferably, the age of the visitor may also be obtained by the current date minus the birth date of the visitor (which may be obtained from the registered information).

The two categories of visitor information, the "number of visits to page A (or B)" and "having sent inquiry message to the website or not" may be obtained from a network management system of the website. In some embodiments, the back management system may store information in a database. Because it is highly possible that these two categories of information may change in a short period of time, the network management system should provide the calculation model with the latest information periodically or in real-time. The calculation model calculates the visitor's value periodically or in real-time according to the information provided by the network management system.

The network management system obtains and sends the relevant information of the visitor to the input port of the determined calculation model in a predetermined data structure. The parameters of the predetermined data structure of the current example is as follows:

{identifier of visitor, age, number of visits to page A, number of visits to page B, having sent inquiry message to the website or not}

Specifically, the identifier of the visitor is not an input parameter for the calculation model for calculation purposes and is merely used to uniquely identify the visitor. For example, the identifier may be an ID registered with the website, a visitor number assigned for the visitor by the website, or anything of the like.

In the current example, the network management system updates the visitor information for the calculation model at a period of every 1 hour. At the first update moment after a first visitor (the visitor number assigned by the website is 001 in this example) visits the website for the first time, the network management system provides the calculation model with data of the information of the visitor as follows:

{001, 15, 1, 1, 0}.

In the current example, a desired output value of the model is in a discrete form (e.g. 0 and 1). However, the actual output from the determined calculation model generally takes a non-discrete form, possibly any value in the range of [0,1] or a value beyond the range (depending on the accuracy requirement of the calculation model). To address this issue, the numerical value output by the model may be discretized. For example, if 0.5 is taken as a threshold, then a visitor with a value exceeding the threshold is considered as valuable and a visitor with a value falling below the threshold is considered as valueless.

If the visitor is considered as valueless according to the determined calculation model, then this determined output value of the model should be consistent with the determination result reached during the manual training process of the calculation model.

In the present example, the determined calculation model may update the calculation result in real-time according to the updated information provided by the network management system. For example, at a certain update moment, the network management system provides the determined calculation model with data regarding the information of the visitor as follows:

{001, 15, 3, 1, 0}.

In the present example, because this information meets the above condition 1) ("a visitor at the age of 10-16 years and having visited page A more than 3 times is considered as valuable"), the determined calculation model may output a value higher than 0.5, i.e. the visitor is considered as valuable. The determined calculation model may also feed back the output value to the network management system. In the present example, because the output value is one of only two possible values, i.e. "valuable" or "valueless", the determined calculation model may feed back only the identifier of the visitor to the network management system, which indicates that the visitor is valuable. If the calculation result is selected from more than two possible values, then the specific output value may be fed back to the network management system in addition to the identifier of the visitor. The network management system may prompt the webmaster by way of sound, visual change on screen and the like, so that the webmaster may carry out a further service activity for the visitor in response to the fed back information.

It can be understood by those skilled in the art that the network management system may provide the determined calculation model with information of multiple visitors at each update, and the determined calculation model may calculate, depending on the implementation thereof, the values of the multiple visitors in parallel or in series and feed back the identifiers of the visitors who are considered as valuable (and the calculation result) to the network management system.

Figure 3:
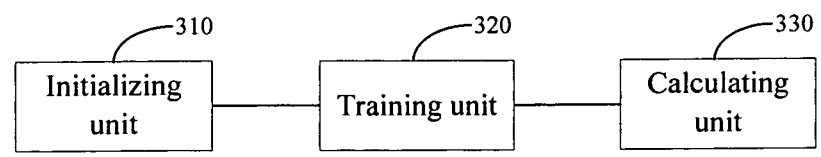
FIG. 3 is a block diagram illustrating another embodiment of a system for calculating a value of a website visitor.

FIG. 3 is a block diagram illustrating another embodiment of a system for calculating a value of a website visitor. The system in the embodiment is described to include a number of units and subunits. The subunits/units can be implemented as software components executing on one or more processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipments, etc.) implement the methods described in the embodiments of the present invention. The subunits/units may be implemented on a single device or distributed across multiple devices.

Initializing unit 310 is adapted for initializing a calculation model for calculating the value of the website visitor, where the calculation model may be a neural network model with visitor information as an input and the visitor's value as an output.

The initialized calculation model may take the following form:

$$Y=f_2(W_2 f_1(W_1 X+B_1)+B_2)$$

where X is an input vector; Y is an output vector; $W_1$ is a hidden layer weight matrix; $B_1$ is a hidden layer bias vector; $f_1$ is a hidden layer transfer function; $W_2$ is an output layer weight matrix; $B_2$ is an output layer bias vector; and $f_1$ is an output layer transfer function.

Depending on specific service requirements, the visitor information and the visitor's value, which act as the respective input and output of the calculation model, may be a numerical visitor information and a numerical visitor's value.

Training unit 320 is adapted for training the calculation model and determining the calculation model. The training unit 320 may train the calculation model by using a Back Propagation (BP) algorithm. When an error between a calculated sample output value and a desired output value meets an accuracy requirement, the calculation model is determined.

The present embodiment of the system uses a neural network as the calculation model for calculating the value of the website visitor. By way of training, the model may learn the affirmative activities of the webmaster and model various complicated correspondence relationships between the visitor information and the visitor's value.

Calculating unit 330 is adapted for obtaining the visitor information and calculating the value of the visitor by using the determined calculation model. In some embodiments, visitor information may be obtained from information registered by the visitor with the website. After the training is completed, the determined calculation model can automatically calculate the visitor's value based on various information regarding the visitor. Because the model is trained to output certain manually determined desired values, the actual calculated results of the model tends to be consistent with the manually determined desired values.

Figure 4:
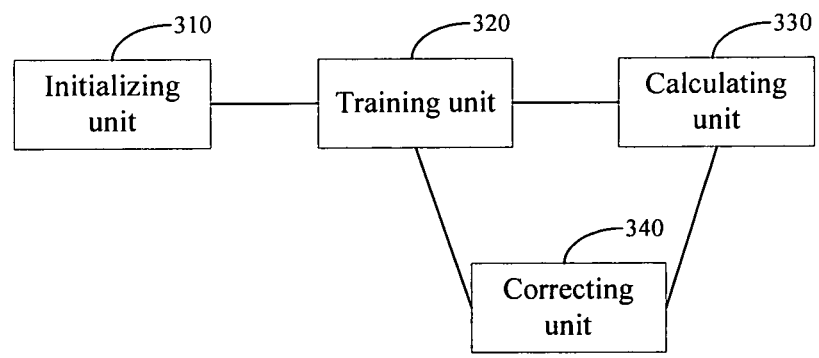
FIG. 4 is a block diagram illustrating a further embodiment of the system for calculating the value of the website visitor that includes a correcting unit.

FIG. 4 is a block diagram illustrating a further embodiment of the system for calculating the value of the website visitor that includes a correcting unit 340. Correcting unit 340 is adapted to correct the determined calculation model. The result of correction by correcting unit 340 is a new calculation model.

In this embodiment of FIG. 4, the calculating unit 330 is adapted for calculating the value of the visitor by using the new calculation model determined by the correcting unit 340.

One embodiment of the correcting unit 340 may include:

a correlation determining subunit adapted to determine a correlation between the visitor's value and a category of the visitor information from the determined calculation model; and an input vector deleting subunit adapted to delete the category of the visitor information, for which the correlation with visitor's value is lower than a preset threshold, from the input vector of the determined calculation model.

In the above embodiment of the system, the visitor information that has weak influence on the output visitor's value may be removed from the input vector of the calculation model, thereby improving the calculation performance of the model.

One embodiment of the correcting unit 340 may further include:

a comparing subunit adapted to compare, periodically or at random, an actual output value of the determined calculation model with a desired output value; and a reconstructing subunit adapted to re-train the determined calculation model if an error obtained by the comparing subunit is higher than a preset threshold.

In the above embodiment of the system, the error of the calculation model can be monitored in real-time, and the calculation model can be corrected according to the result of the monitoring, thus making the system adaptive to dynamic changes of the service requirements.

Those skilled in the art can understand that the correcting unit 340 may be a combination of the above two embodiments.

The description of the system embodiment, which substantially corresponds to the method embodiment, is relatively brief, and reference can be made to descriptions of the method embodiment for more details. The system embodiment described above are merely illustrative, where the units that are described as separate elements may be or alternatively may not be physically separate from each other, and the elements being indicated as units may be or alternatively may not be physical units, i.e. may be located at the same site or alternatively be distributed over multiple network devices. Parts or all of the elements of the embodiments of the invention may be selected as needed to achieve the desired solution. Embodiments of the invention can be understood and implemented by those skilled in the art without exerting an inventive effort.

For the convenience of description, the above system is described as different units according to the functions thereof respectively. During implementation of the present invention, the functions may be of course embodied in the same or different software and/or hardware.

It can be understood by those skilled in the art from the above description of the above embodiment that, the embodiment of the present invention may be implemented through software plus a necessary general hardware platform. Based on such understanding, the technical solution according to the embodiment of the present invention substantially, or part thereof that makes a contribution over the prior art, may be embodied in the form of a software product. The computer software product may be stored in a storage medium, such as an ROM/RAM, a magnetic disk and an optical disk, which includes a number of instructions thereon to make a computer device (which may be a personal computer, a server, or a network device, etc.) to perform the method described in the embodiment of the present invention or part thereof.

The above are merely specific embodiments of the present invention. Those skilled in the art can make various alterations and modifications without departing from the spirit and scope of the invention. Such alterations and modifications are intended to fall into the scope of the present invention.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for calculating a value of a website visitor, comprising:
   initializing a calculation model for calculating the value of the website visitor, the calculation model being a neural network model with visitor information as an input and the value of the website visitor as an output;
   training the calculation model by using a data sample;
   determining the calculation model;
   obtaining the visitor information, wherein the visitor information includes a plurality of categories; wherein the visitor information is automatically detected from the website visitor or obtained from registration information of the website visitor, and wherein the plurality of categories includes at least two of the following: gender of the visitor, age of the visitor, region of the visitor, number of visits of a website by the visitor, page visited by the visitor, stay time of a visit of the website, whether the visitor performs chatting, whether the visitor performs sending an email, number of times the visitor performs chatting, or number of times the visitor performs sending the email;
   converting the obtained information into corresponding numerical values to be input into the calculation model;
   calculating the value of the visitor by using the determined calculation model; wherein:
      the calculation model includes an input layer, a hidden layer, and an output layer;
      the hidden layer is associated with a hidden layer transfer function;
      the output layer is associated with an output layer transfer function; and
      the hidden layer transfer function is different from the output layer transfer function;
   correcting the calculation model that is currently determined, the correcting of the calculation model including:
      obtaining a correlation between the visitor's value and a category of the visitor information from the calculation model currently determined; and
      deleting the category of the visitor information from the input vector of the calculation model currently determined in the event that the correlation of the category is lower than a preset threshold, wherein the deleting of the category of the visitor information includes eliminating the category of the visitor information from the input vector of the calculation model;
   dynamically updating the calculation model with the corrected calculation model, comprising:
      calculating the value of the visitor using the corrected calculation model;
   determining whether the value of the visitor meets or exceeds a threshold;
   in the event that the value of the visitor meets or exceeds the threshold, performing a first service activity; and
   in the event that the value of the visitor does not meet and does not exceed the threshold, performing a second service activity.

2. The method according to claim 1, wherein the initialized calculation model is $Y=f_2(W_2 f_1(W_1 X+B_1)+B_2)$; and wherein
   X is an input vector; Y is an output vector, $W_1$ is a hidden layer weight matrix; $B_1$ is a hidden layer bias vector, $f_1$ is the hidden layer transfer function, $W_2$ is an output layer weight matrix, $B_2$ is an output layer bias vector, and $f_2$ is the output layer transfer function.

3. The method according to claim 2, wherein $f_1$ is a non-linear action function and $f_2$ is a linear function.

4. The method according to claim 1, wherein the visitor information as the input to the calculation model is numerical information and the visitor's value as the output from the calculation model is a numerical value.

5. The method according to claim 1, wherein the training the calculation model comprises training the calculation model by using Back Propagation.

6. The method according to claim 1, wherein determining the calculation model comprises determining the calculation model when an error between a sample output value of the calculation model and a desired output value meets an accuracy requirement.

7. The method according to claim 1, wherein correcting the calculation model currently determined comprises:
   comparing an actual output value of the calculation model currently determined with a desired output value to obtain an error between the actual output value and the desired output value; and
   re-training the calculation model when the error is higher than a preset threshold.

8. The method of claim 1, wherein the value of the website visitor, at least in part, determines a service activity to be performed for the website visitor.

9. A system for calculating a value of a website visitor, comprising:
   one or more processors configured to:
      initialize a calculation model for calculating the value of the website visitor, the calculation model being a neural network model with visitor information as an input and the visitor's value as an output;
      train the calculation model by using a data sample;
      determine the calculation model;
      obtain the visitor information, wherein the visitor information includes a plurality of categories; wherein the visitor information is automatically detected from the website visitor or obtained from registration information of the website visitor, and wherein the plurality of categories includes at least two of the following: gender of the visitor, age of the visitor, region of the visitor, number of visits of a website by the visitor, page visited by the visitor, stay time of a visit of the website, whether the visitor performs chatting, whether the visitor performs sending an email, number of times the visitor performs chatting, or number of times the visitor performs sending the email;
      convert the obtained information into corresponding numerical values to be input into the calculation model;
      calculate the value of the visitor by using the determined calculation model; wherein:
         the calculation model includes an input layer, a hidden layer, and an output layer;
         the hidden layer is associated with a hidden layer transfer function;
         the output layer is associated with an output layer transfer function; and
         the hidden layer transfer function is different from the output layer transfer function;
      correct the calculation model that is currently determined, the correcting of the calculation model including:
         obtain a correlation between the visitor's value and a category of the visitor information from the calculation model currently determined; and
         delete the category of the visitor information from the input vector of the calculation model currently determined in the event that the correlation of the category is lower than a preset threshold, wherein the deleting of the category of the visitor information includes eliminate the category of the visitor information from the input vector of the calculation model;
      dynamically update the calculation model with the corrected calculation model, wherein model, comprising to:
         calculate the value of the visitor using the corrected calculation model;
         determine whether the value of the visitor meets or exceeds a threshold;
         in the event that the value of the visitor meets or exceeds the threshold, perform a first service activity; and
         in the event that the value of the visitor does not meet and does not exceed the threshold, perform a second service activity; and
   one or more memories coupled to the one or more processors and configured to provide the processor with instructions.

10. The system according to claim 9, wherein the initialized calculation model is:

$$Y=f_2(W_2 f_1(W_1 X+B_1)+B_2); \text{ and wherein}$$

X is an input vector; Y is an output vector, $W_1$ is a hidden layer weight matrix; $B_1$ is a hidden layer bias vector, $f_1$ is the hidden layer transfer function, $W_2$ is an output layer weight matrix, $B_2$ is an output layer bias vector, and $f_2$ is the output layer transfer function.

11. The system according to claim 9, wherein $f_1$ is a non-linear action function and $f_2$ is a linear function.

12. The system according to claim 9, wherein the visitor information as the input to the calculation model is numerical information and the visitor's value as the output from the calculation model is a numerical value.

13. The system according to claim 9, wherein the one or more processors are configured to train the calculation model by using Back Propagation.

14. The system according to claim 9, wherein the one or more processors are configured to determine the calculation model when an error between a sample output value of the calculation model and a desired output value meets an accuracy requirement.

15. The system according to claim 9, wherein the one or more processors are further configured to:
   compare an actual output value of the calculation model currently determined with a desired output value to obtain an error between the actual output value and the desired output value; and
   re-train the calculation model when the error obtained by the comparing subunit is higher than a preset threshold.

16. A computer program product for calculating a value of a web site visitor, the computer program product being embodied in a non-transitory computer readable storage medium and comprising computer instructions for:
   initializing a calculation model for calculating the value of the website visitor, the calculation model being a neural network model with visitor information as an input and the value of the website visitor as an output;
   training the calculation model by using a data sample;
   determining the calculation model;
   obtaining the visitor information, wherein the visitor information includes a plurality of categories; wherein the visitor information is automatically detected from the website visitor or obtained from registration information of the website visitor, and wherein the plurality of categories includes at least two of the following:

gender of the visitor, age of the visitor, region of the visitor, number of visits of a website by the visitor, page visited by the visitor, stay time of a visit of the website, whether the visitor performs chatting, whether the visitor performs sending an email, number of times the visitor performs chatting, or number of times the visitor performs sending the email;

converting the obtained information into corresponding numerical values to be input into the calculation model;

calculating the value of the visitor by using the determined calculation model; wherein:

the calculation model includes an input layer, a hidden layer, and an output layer;

the hidden layer is associated with a hidden layer transfer function;

the output layer is associated with an output layer transfer function; and the hidden layer transfer function is different from the output layer transfer function;

correcting the calculation model that is currently determined, the correcting of the calculation model including:

obtaining a correlation between the visitor's value and a category of the visitor information from the calculation model currently determined; and deleting the category of the visitor information from the input vector of the calculation model currently determined in the event that the correlation of the category is lower than a preset threshold, wherein the deleting of the category of the visitor information includes eliminating the category of the visitor information from the input vector of the calculation model;

dynamically updating the calculation model with the corrected calculation model, comprising:

calculating the value of the visitor using the corrected calculation model;

determining whether the value of the visitor meets or exceeds a threshold;

in the event that the value of the visitor meets or exceeds the threshold, performing a first service activity; and in the event that the value of the visitor does not meet and does not exceed the threshold, performing a second service activity.

17. The method of claim 1, wherein initializing the calculation model includes selecting an appropriate number of nodes for at least one layer of the neural network model.

18. The system of claim 9, wherein initializing the calculation model includes selecting an appropriate number of nodes for at least one layer of the neural network model.

19. The method according to claim 1, wherein the output layer includes a single node.

20. The method according to claim 1, wherein:

the service activities include calling the website visitor, chatting over a network with the website visitor, sending an email to the website visitor, adding the website visitor into a client relationship management system, or any combination thereof.

21. The method according to claim 1, wherein the plurality of categories includes at least three of the following: gender of the visitor, age of the visitor, region of the visitor, number of visits of a website by the visitor, page visited by the visitor, stay time of a visit of the website, whether the visitor performs chatting, whether the visitor performs sending an email, number of times the visitor performs chatting, and number of times the visitor performs sending the email.

22. The method according to claim 1, wherein the deleting of the category of the visitor information includes:

notifying a webmaster to determine whether to delete the category of the visitor information from the input vector of the calculation model; and in the event that the webmaster determines to delete the category of the visitor information from the input vector of the calculation model, deleting the category of the visitor information from the input vector of the calculation model.

* * * * *